March 26, 1940.  B. LONG  2,194,760
TEMPERING GLASS SHEET
Filed Feb. 11, 1935  2 Sheets-Sheet 1

Inventor
Bernard Long
By Dorsey & Cole
Attorney

March 26, 1940.  B. LONG  2,194,760
TEMPERING GLASS SHEET
Filed Feb. 11, 1935   2 Sheets-Sheet 2

Inventor
Bernard Long
By Dorsey & Ole
Attorney

Patented Mar. 26, 1940

2,194,760

UNITED STATES PATENT OFFICE 2,194,760

TEMPERING GLASS SHEETS

Bernard Long, Paris, France, assignor to The American Securit Company, a corporation of Delaware Application February 11, 1935, Serial No. 6,076
In France February 17, 1934

12 Claims. (Cl. 49—45)

The present invention provides an improved method and apparatus for tempering glass plates or sheets.

It is known to effect the consecutive heating and cooling requisite for such tempering either by transporting the sheet from a heating chamber to a cooling chamber or by displacing these chambers relative to the sheet while it is maintained immobile.

In such methods a certain time elapses between the heating and the sudden cooling (such sudden cooling being the actual means producing the case hardening effect on the sheet). Consequently the sudden cooling occurs only after the sheet has lost a part of its temperature. For a good case hardening the temperature of the glass at the time of the sudden cooling must be as near as possible to the softening point of the glass. With the heretofore used methods it often happens that said condition can be obtained only by overheating the sheet, with the consequent possible danger of having the sheet warped under its own weight.

In practice it is preferable to stop heating before having any risk of warpage, this often leading to an insufficient case hardening.

The principal aim of the invention is to avoid such disadvantage.

The invention consists in combining the heating and cooling so as to avoid the loss of time between heating and cooling operations, that is, to cool the sheet without any interval of time after the heating operation.

The invention may be carried out by combining the heating and the cooling so that any displacement of the sheet in respect of the heating and cooling devices is avoided between the heating and cooling operations.

According to the invention both the heating and cooling means remain in effective operable position relative to the glass sheet during the processes of heating and cooling, whereby the glass sheet, the heating means and the cooling means all remain stationary, except for such small movements as may be required for adjustment or for uniform distribution of the heating or the cooling.

One embodiment thereof consists in interposing the heating members between the cooling members, the latter being brought into operation immediately after the former.

Another method consists in the use of a pipe apparatus perforated with openings directed to the sheet and operating successively as gas burners for heating the sheet and as members for blowing a cooling fluid.

A third method of realization consists in the use of a set of gas burners for heating the sheet and nozzles for blowing out air during the cooling period each set being successively in operation and the blowing nozzles being used as suckers for hot gases during the heating period.

The heating and cooling units may be adjusted at right angles to the plane of the sheet in order to vary their operative positions to obtain the best results. The heating and cooling units or the sheet may be moved also during the treatment in a plane parallel to the plane of the sheet, so that a slight relative movement is effected between the sheet and the units, as is disclosed in U. S. patent to Bernard Long, No. 1,960,222, issued May 27, 1934. Such movement, when utilized, will afford a uniform heating and cooling of the sheet at all points.

In the various methods by means of which the invention can be carried out it is possible to modify the distance between the sheet of glass and the two groups of heating and cooling members. These latter may also be moved parallel with the glass sheet, so that all points thereof are heated, then cooled.

In order to be sure that the sudden cooling means are in operation before any heat loss following the stoppage of the heating means, the invention also provides that the cooling means can begin to operate before the heating means stop.

This invention gives the following advantages:

1. The possibility of applying to the sheet a sudden cooling while the sheet is at the maximum temperature where the heating means brought it, thus having the highest quality of case hardening.

2. As the sheet is held stationary, one avoids the shakes that would occur if it were transported. Moreover the sheet can be heated very near its softening point, which contributes to the highest quality of case hardening.

3. Reduction of the size and cost of the tempering apparatus.

4. Rapid starting up in the case of interrupted discontinuous tempering operations.

Various embodiments showing how the invention is carried out are illustrated by way of example on the accompanying drawings.

Figure 1:
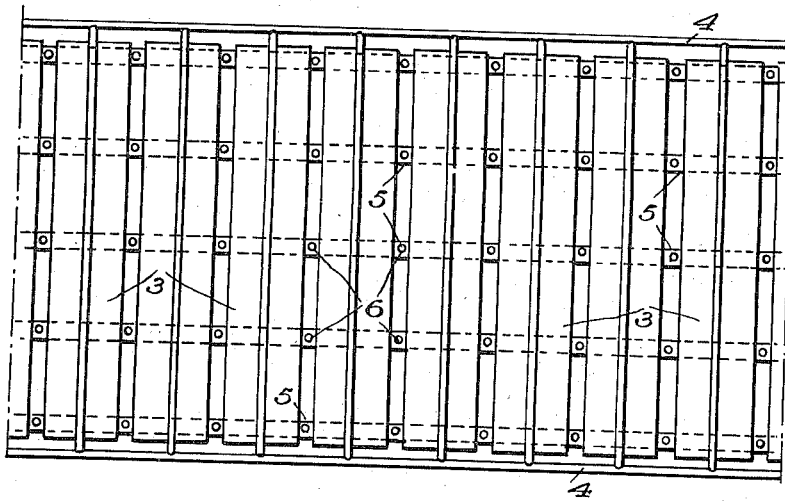
Figure 1 is a vertical section, parallel with the plane of the glass sheet, of an apparatus comprising electrical heating resistances alternating with blowing nozzles.
Figure 2:
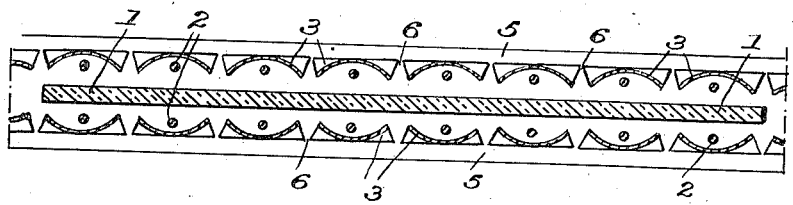
Figure 2 is a horizontal section of the same apparatus.

On Figures 1 and 2 the sheet of glass 1 is suspended vertically by grippers, or any other supporting means, between two groups of heating resistances 2 located at the face of reflectors 3. The resistances of each group are mounted in shunt on two current feed bars 4.

Tubes 5 affixed to the rear face of the reflectors and branched on an air distributing passage (not shown) are perforated with openings provided with air blowing nozzles 6, which are disposed between the reflectors.

Figures 3, 4:
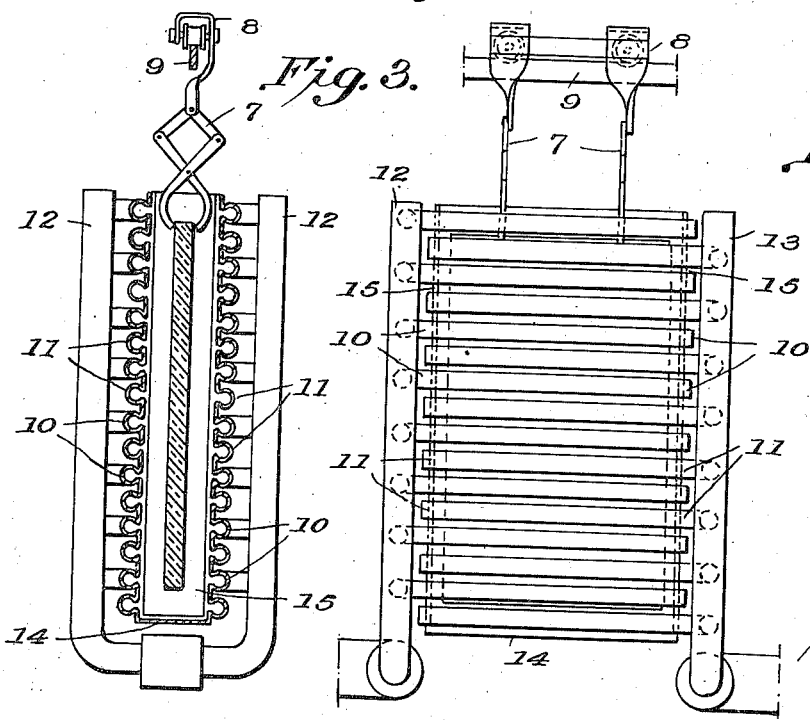
Figure 3 is a vertical section, perpendicular to the plane of the glass sheet, of an apparatus in which gas burner groups alternate with blower nozzles.
Figure 4 is a lateral elevation of this apparatus.

In the apparatus of Figures 3 and 4 the glass plate 1 is suspended vertically by means of grippers 7 carried by a roller carriage 8 movable on a rail 9. It is placed between two groups of gas burners 10 alternating with air blower nozzles 11, the burners being connected with a gas reservoir 12 and the nozzles with a compressed air reservoir 13.

The burners and nozzles are affixed to the lateral walls of a housing 14 open above and provided, at the ends of these lateral walls, with doors or ports 15 through which the glass plates may be introduced.

Figure 5:
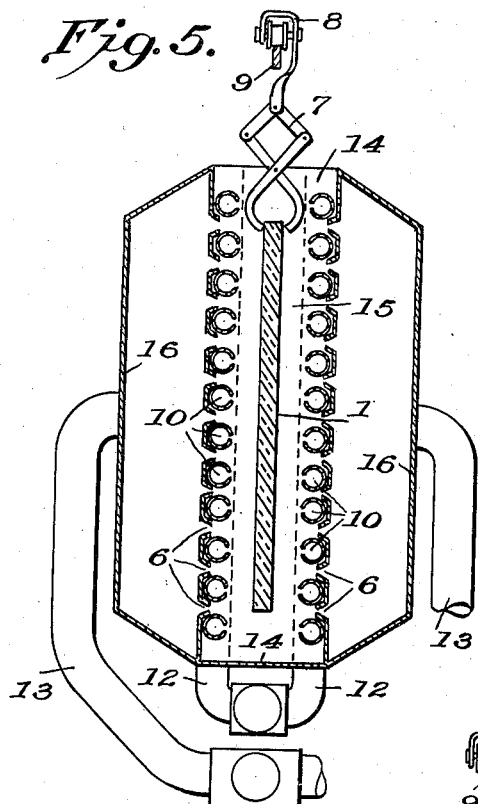
Figure 5 is a vertical section, perpendicular to the plane of the glass plate, of a modification of the preceding apparatus.

On Figure 5 the reference numerals 1, 7, 8, 9, 10, 12, 13, 14 and 15 designate the same parts as on Figures 3 and 4; the blowing takes place through the openings 6 perforated in the lateral walls of the two housings 16 which form the sides of the housing 14 and which are connected with the air reservoir 13.

Figure 6:
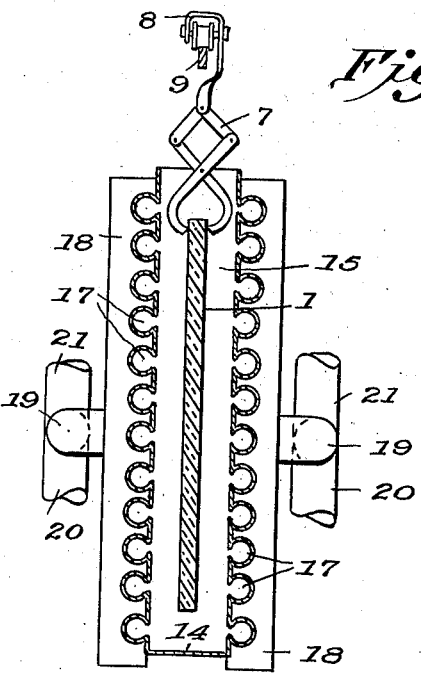
Figure 6 is a vertical section, perpendicular to the plane of the glass sheet, of an apparatus in which the same distributors serve successively as gas burners and then as cooling nozzles.

In the apparatus of Figure 6, wherein the reference numerals 1, 7, 8, 9, 14 and 15 designate the same elements as on Figures 3, 4 and 5, the members 17 serve alternately as burners and blowing nozzles and are branched to the two reservoirs 18 which are connected by means of three-way cocks 19 to the gas passage 20 as well as to the compressed air passage 21.

Figure 7:
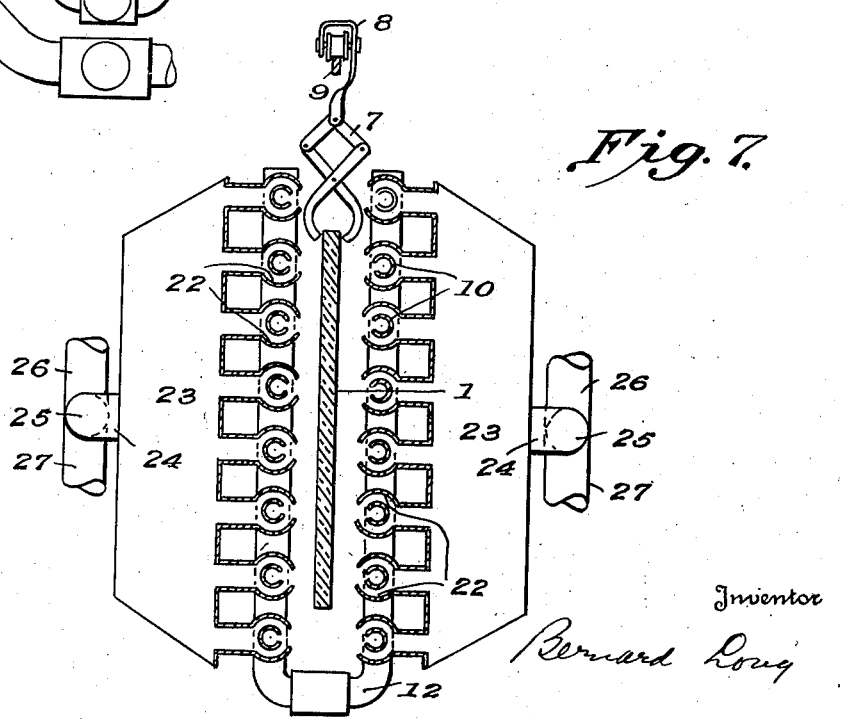
Figure 7 is a vertical section, perpendicular to the plane of the glass plate, of a modification of the same apparatus in which the gases burned during the heating of the sheet are drawn in by nozzles encompassing the burners, these nozzles serving also for blowing the air for the tempering.

On Figure 7, wherein the reference characters 1, 7, 8, 9, 10 and 12 represent the same parts as on Figures 3, 4, 5 and 6, the members 22 connected with the housings 23 serve alternately as suction members which draw in the gases burned during the heating of the glass plate 1 and as blower nozzles during the cooling thereof. For this purpose tubes 24 terminate in the housings 23 and are connected by three-way cocks 25 with the air passage 26 as well as with the suction pipe 27.

Such arrangement enables to prevent the burnt gases from causing convection streams along the sheet and from overheating the top of the sheet relatively to its bottom.

What is claimed is:

1. Apparatus for tempering glass sheets and the like, comprising means for supporting a glass sheet, means for heating it consisting of a plurality of separated members, means for cooling it consisting of a plurality of separated members, the last named members being separate from and alternatively arranged with the first mentioned members.

2. In a device for tempering glass sheets, the combination of supporting means for the sheet, and means located on opposite sides of the sheet throughout the area thereof and substantially parallel therewith for applying to the sheet first a heating gaseous fluid and thereafter a cooling gaseous fluid.

3. In a device for tempering glass sheets, the combination of a support for maintaining the sheet in a substantially stationary position, with means located on opposite sides of the sheet and out of contact therewith, for applying to the sheet a heating gaseous fluid and means located on opposite sides of the sheet for applying cooling gaseous fluid.

4. In a device for tempering glass sheets, the combination of a support for maintaining the sheet in a substantially stationary position, and means located on opposite sides of the sheet substantially parallel and out of contact therewith, for applying to the sheet first a heating gaseous fluid and thereafter a cooling gaseous fluid.

5. In a device for tempering glass sheets, the combination of supporting means for the sheet, a plurality of sets of heating and cooling nozzles alternately arranged and having their open ends substantially parallel with the opposite surfaces of the sheet, and means for introducing successively, a heating and a cooling medium through the respective nozzles toward the sheet.

6. In a device for tempering glass sheets, the combination of supporting means for the sheet, a plurality of nozzles having their open ends arranged substantially parallel with opposite surfaces of the sheet, and means for introducing a heating medium through at least several of the nozzles and a cooling medium through other of the nozzles toward the sheet, the introduction of the heating medium preceding the introduction of the cooling medium.

7. In a device for tempering glass sheets, the combination of supporting means for the sheet, a plurality of nozzles having their open ends arranged substantially parallel with opposite surfaces of the sheet, and means for introducing successively a heating and a cooling medium through said nozzles toward said sheet.

8. In a device for tempering glass sheets, the combination of supporting means for the sheet, a plurality of nozzles having their open ends arranged substantially parallel with opposite surfaces of the sheet, one set of said nozzles being partially surrounded by the other set of said nozzles, means for introducing a heating medium through one of the sets and means for introducing a cooling medium through the other set.

9. In a device for tempering glass sheets, the combination of supporting means for the sheet, a plurality of nozzles having their open ends arranged substantially parallel with opposite surfaces of the sheet, one set of said nozzles being partially surrounded by the other set of said nozzles, means for introducing a heating medium through the first set of nozzles, means for establishing a sub-atmospheric condition in the second set of nozzles to exhaust burnt gases, and means for thereafter introducing cooling air through the last named nozzles to cool the sheet.

10. In a device of the character described, the combination of a support for a sheet of glass, a series of heating elements and a series of cooling elements, the elements of each series being alternately arranged on each side of the sheet.

11. In a device for tempering glass sheets, the combination with supporting means for the sheet, with means located on opposite sides of the sheet for applying to the sheet a heating medium and consisting of separated members, means located on opposite sides of the sheet for applying to the sheet a cooling medium and consisting of separated members alternatively arranged with the above said members, and means for effecting a relative motion between the sheet and the heating and cooling means in planes parallel to the plane of the sheet.

12. In a device for tempering glass sheets, the combination of a support for maintaining the sheet in a substantially stationary position, with means for heating it located on opposite sides of the sheet and out of contact therewith, consisting of a plurality of separated members, and means located on opposite sides of the sheet for cooling it and consisting of separated members alternatively arranged with the above said members, without effecting a movement of said sheet.

BERNARD LONG.